May 12, 1959   C. C. GEORGIAN   2,886,610
SOLVENT RECOVERY SYSTEM
Filed April 28, 1954
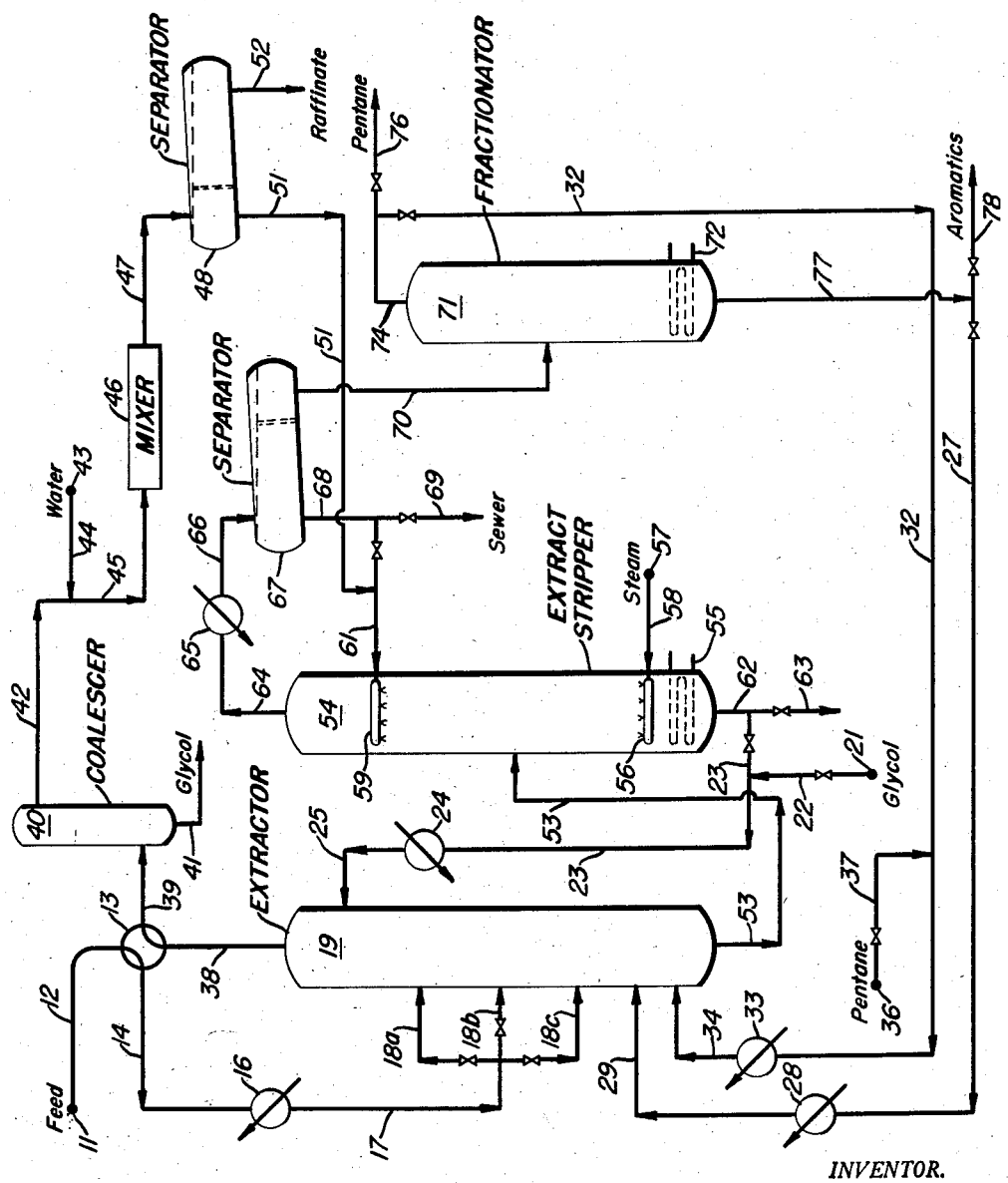
INVENTOR.
Carl C. Georgian
BY
ATTORNEY

United States Patent Office

2,886,610
Patented May 12, 1959

2,886,610
SOLVENT RECOVERY SYSTEM

Carl C. Georgian, La Marque, Tex., assignor to The American Oil Company

Application April 28, 1954, Serial No. 426,110

11 Claims. (Cl. 260—674)

This invention relates to solvent extraction of hydrocarbon mixtures and particularly to the recovery of the solvent from the extract phase. More particularly, the invention relates to the recovery of solvent from the extract hydrocarbons in a process wherein the extract hydrocarbons are distilled away from the solvent.

Hydrocarbons occur naturally as mixtures of various classes, namely, paraffinic, olefinic, naphthenic and aromatic; usually appreciable amounts of compounds containing oxygen and/or sulfur are present. These mixtures may be separated into more or less pure classes by means of liquid glycol solvents. For economic reasons, processes using liquid glycol solvents separate the extract hydrocarbons from the solvent by distillation. This distillation may be vacuum, steam, atmospheric pressure, or super atmospheric pressure.

When operating according to conventional distillation procedure, in all cases appreciable amounts of glycol solvent appear in the extract hydrocarbons even though the distillation operation is carried out at temperatures well below the boiling point of the glycol solvent. When operating with aromatic hydrocarbons in the extract phase, considerable amounts of the glycol solvent appear in the aromatic hydrocarbons taken overhead in the distillative recovery procedure. Conventional practice separates the glycols from the product extract hydrocarbons by taking advantage of the low solubility of glycols and hydrocarbons at ordinary atmospheric temperatures. Thus, the extract hydrocarbon-glycol vapor mixture is condensed in a heat exchanger and passed to a separator wherein substantially all of the glycol separates by gravity and may be withdrawn from the separator as a separate phase. The dissolved glycol is then recovered from the extract hydrocarbons by washing the mixture with water. The glycols readily pass into the water phase and may be recovered from the water phase by distillation. It is obvious that this procedure for the secondary recovery of glycol solvent is expensive.

An object of this invention is the separation of hydrocarbon mixtures by treatment with a liquid glycol solvent. Another object is the recovery of glycol solvent from the extract phase formed in the treatment of the hydrocarbon mixture with liquid glycol solvent. A particular object is the recovery of glycol solvent from an extract phase by distilling away the extract hydrocarbons, leaving glycol solvent as a bottoms product. The preferred object of the invention is the secondary recovery of glycol from the vapor phase mixture of extract hydrocarbons and glycol derived by distillation of an extract phase consisting essentially of liquid glycol solvent and extract hydrocarbons. Other objects will become apparent in the course of the detailed description.

Essentially complete recovery of the glycol solvent is obtained in the hydrocarbon separation process wherein a liquid glycol solvent and a liquid hydrocarbon feed, which contains compounds of differing miscibility in said solvent, are contacted under conditions to form separate raffinate and extract phases and wherein the hydrocarbon compounds dissolved in said extract phase are recovered by distillation, under conditions where the solvent is a liquid bottoms product and where appreciable amounts of solvent distill with the extract hydrocarbons, when a liquid aqueous stream is introduced into said distillation zone, at a point above the point of entry of said extract phase, in an amount sufficient to remove essentially all of the solvent from the mixture of solvent vapors and extract hydrocarbon vapors, condensing the vapor stream leaving said distillation zone and separating liquid water phase from an extract hydrocarbon phase, which phases are essentially free of solvent. Usually the amount of aqueous liquid introduced into the upper point of the distillative recovery zone is between about 5 and 200 volume percent of the extract hydrocarbons present in the extract phase.

The feed to the process of this invention consists of a mixture of hydrocarbons from at least two of the broad classes, paraffinic, naphthenic, olefinic and aromatic, such as naturally occur in petroleum or the products from hydrocarbon conversion processes. A preferred feed consists of petroleum naphthas containing large amounts of aromatic hydrocarbons, e.g., catalytically cracked naphthas and the naphtha boiling range material from catalytic reforming in the presence of hydrogen. Examples of these stocks are hydroformate and platformate. The process is also applicable to the separation of olefins and diolefins as in the separation of butadiene from admixture with butanes and butenes or to the separation of styrenes from ethylbenzene and xylenes. In general, the process is applicable to any feed which is susceptible to separation by treatment with a glycol solvent, wherein the extract hydrocarbons boil below the glycol solvent.

The selective solvents utilized in this process are broadly known as glycols, i.e., the dihydric alcohols. Particularly desirable solvents are the polyglycols, i.e., polymeric glycols containing ether linkages. The halogen and the ether derivatives of glycols are also suitable solvents for this process. Particular examples of the solvents are ethylene glycol, diethylene glycol, triethylene glycol, tetraethylene glycol, propylene glycol, dipropylene glycol, ethylene glycol monomethyl ether, ethylene glycol diethy ether, propylene glycol monoethyl ether. The preferred solvents are the polyethylene glycols, particularly diethylene glycol and triethylene glycol.

The solvent power of these glycols improves at elevated temperatures. Therefore, normally a selective solvent extraction process using glycol solvent operates at temperatures between about 100° F. and the incipient thermal decomposition temperature of the particular glycol. More usually the contacting zone is maintained at a temperature between about 200° and 350° F. It is to be understood that certain of the polyglycols are solids at ordinary temperatures and the temperature maintained in the process must be at least high enough to maintain these particular glycols in the liquid state. Furthermore, this glycol extraction process is a liquid-liquid operation and sufficient pressure must be maintained on the system to keep the solvent, the feed and the hydrocarbon oil in the liquid state.

The annexed drawing which is made a part of this specification shows an illustrative embodiment of the process of this invention. It is to be understood that many items of equipment and details of operation are omitted where these can be readily supplied by those skilled in this art.

In the drawing the feed is a hydroformate naphtha obtained from the reforming of a virgin heavy naphtha over a cobalt molybdenum catalyst in the presence of hydrogen. This hydroformate has an ASTM end point of about 385° F. and contains benzene, toluene, ethylbenzene and xylene as the aromatic hydrocarbon constituents. Substantially no olefinic hydrocarbons are present in this feed.

Feed from source 11 is passed through line 12 through heat exchanger 13 wherein the temperature is raised by indirect contact with hot raffinate phase. From exchanger 13 the feed is passed by way of line 14 through heat exchanger 16, line 17 and manifold 18a, 18b, 18c into extractor 19. In heat exchanger 16 the feed is raised to about the temperature of operation of extractor 19.

In this embodiment the feed is introduced at about the vertical midpoint of extractor 19 by way of valved line 18b. However, the feed may be introduced at various points along the height of extractor 19 as illustrated by lines 18a, 18b and 18c. The type of feed and operating conditions will determine the exact point of feed inlet into extractor 19.

Extractor 19 is a vertical tower equipped to provide intimate contact of two immiscible liquids of different densities. Extractor 19 may be filled with conventional tower packing such as Raschig rings, Berl saddles, spheres, or may be provided with contacting trays such as bubble trays or perforated plates.

Extractor 19 is operated at an elevated temperature appreciably lower than the incipient decomposition temperature of the triethylene glycol solvent used herein. In this embodiment extractor 19 operated at a temperature of 275° F. Although extractor 19 may in some cases be operated with a temperature gradient over the height of the vessel, in this embodiment a substantially constant temperature is maintained throughout the vessel.

In some cases it is desirable to operate with a glycol-water solution as the selective solvent, e.g., a solution of diethylene glycol containing between about 5 and 10 volume percent of water. In this embodiment an essentially anhydrous triethylene glycol solvent is used.

The amount of solvent used per volume of feed is dependent upon the type of feed, the type of glycol and operating conditions in extractor 19. In general the amount of solvent used may be between about 1 and 25 volumes per volume of feed, preferably between about 5 and 15 volumes. In this embodiment 8 volumes of triethylene glycol are used per volume of feed.

Glycol solvent from source 21 is passed through valved line 22 and line 23 to heat exchanger 24. In heat exchanger 24 the temperature of the solvent stream is raised to the operating temperature of the extractor and the hot glycol is passed by way of line 25 into extractor 19 at a point near the upper end of said extractor.

In order to improve the selectivity of extraction a reflux stream of aromatic hydrocarbons is introduced near the bottom of extractor 19 by way of valved line 27, heat exchanger 28 and line 29. The aromatic hydrocarbons used as reflux have the same composition as the aromatic hydrocarbon product. The amount of reflux used will vary with the degree of selectivity desired on a particular piece of equipment. In general it will be between about 2 and 10 volumes per volume of aromatic hydrocarbon extracted from the feed, i.e., product aromatic hydrocarbon; herein the ratio of reflux to product is 6:1.

Although the selectivity of the glycol solvent is very good, some non-aromatic hydrocarbons are extracted from the feed. These non-aromatic hydrocarbons boil in the range of the aromatic hydrocarbons and cannot be separated by fractional distillation. In order to improve the purity of the aromatic hydrocarbon product, it is desirable to remove these close boiling non-aromatic hydrocarbons. This is accomplished in this embodiment by introducing a wash oil into extractor 19 just above the extract phase outlet. The wash oil should be a hydrocarbon that is easily separable from the product aromatic hydrocarbons by distillation. In this embodiment pentane is used as the wash oil. Pentane is introduced into extractor 19 by way of line 32, heat exchanger 33 and line 34. Makeup, or fresh, pentane may be introduced from source 36 into line 32 by way of valved line 37. In this embodiment the amount of pentane introduced into extractor 19 is about 1 volume per volume of aromatic hydrocarbon product. Of course this amount will vary in accordance with the requirements of any particular operation.

A raffinate phase consisting of substantially dearomatized feed naphtha and some occluded and dissolved solvent is withdrawn from the top of extractor 19 by way of line 38. This hot raffinate phase is passed through heat exchanger 13 where it raises the temperature of fresh feed, thereby saving heat. The cooled raffinate phase is passed from heat exchanger 13 into line 39. From line 39 the cooled raffinate phase is passed into coalescer 40. Coalescer 40 is a vertical vessel provided with coalescing medium such as fibre glass or steel wool; coalescer 40 may, in some instances, be an ordinary separator for two miscible liquids. The separated liquid glycol is withdrawn from the bottom of coalescer 40 and is recycled to extractor 19 by way of line 41, and other lines not shown. The raffinate hydrocarbons which contain a slight amount of dissolved glycol solvent are withdrawn from coalescer 40 by way of line 42.

Liquid water from source 43 is introduced by way of line 44 into line 42. The stream of raffinate hydrocarbons and water is passed by way of line 45 into mixer 46. The water-raffinate phase stream is intimately agitated in mixer 46 for a time sufficient for the water to dissolve the solvent present in the raffinate phase. The amount of water used must be at least enough to form a separate aqueous phase and to dissolve the glycol. In this illustration about 5 volumes percent of water based on raffinate phase is used. A countercurrent tower may be used to contact the water and raffinate phase and thereby lessen the water usage.

The contents of mixer 46 are passed by way of line 47 into separator 48. In separator 48 the aqueous phase of water and solvent is separated from the raffinate hydrocarbons and is withdrawn by way of line 51. Raffinate hydrocarbons are withdrawn from separator 48 by way of line 52 and are passed to storage not shown.

Extract phase is withdrawn from the bottom of extractor 19 by way of line 53 and is passed into about the vertical mid-point of extract stripper 54. Extract stripper 54 is a distillation tower provided with fractionator means and with internal reboiler 55. At a lower point, below the point of extract phase entry, stripper 54 is provided with distributor means 56. Steam from source 57 is passed by way of line 58 into distributor means 56. It is to be understood that extract stripper may be operated in different ways, depending on the particular extract phase which is introduced therein. In some instances, it may not be necessary to operate under either vacuum or steam stripping conditions. With this particular extract phase it is preferred to use steam stripping to lower the bottoms temperature in the extract stripper to a point well below the incipient decomposition temperature of the triethylene glycol, which temperature is 404° F.

At an upper point, stripper 54 is provided with a distributor means 59, which distributor is positioned at a point above the point of extract phase entry into the tower and near the vapor exit end of tower 54. A liquid aqueous stream is introduced by way of valved line 61 to distributor 59 and thence into stripper 54. This liquid aqueous stream may be ordinary water. Herein, water is understood to mean the ordinary quality water which is available for industrial use or for drinking purposes. This water may be from streams, lakes, wells or the by-product of other operations. This water should not contain materials which would interfere with the separation or which may react with either the glycol or the extract hydrocarbons or seriously corrode the materials of which the extract stripper is constructed. Also, the aqueous liquid may consist of a solution of the particular glycol solvent in water. Particularly where the glycol is present in only a minor amount, for example, the aqueous liquid may be the glycol-water solution recovered from the water washing of the raffinate phase. Normally, the glycol solvent will be present in the aqueous liquid in an amount not in excess of about 5–10 volume percent.

The distillation of the extract hydrocarbons produces a vapor that is a mixture of extract hydrocarbon vapor and glycol solvent vapor. In the absence of the liquid aqueous stream from distributor 59, this mixture of vapors would pass out of extract stripper 54. The amount of aqueous liquid introduced into the upper portion of stripper 54 must be at least enough to remove essentially all of the glycol present in the vapors passing up the stripper above the point of extract phase entry. In general, the amount of aqueous liquid introduced into the distillative recovery zone is between about 5 and 200 volume percent, based on extract hydrocarbon in the extract phase. More than this amount may be in some instances, necessary, or may be introduced into the distillation zone for other reasons. In any case, the amount of aqueous liquid introduced should not be in such an excess that it would interfere with the distillative separation of the extract hydrocarbons and the glycol solvent. When operating with an extract phase consisting essentially of polyethylene glycol, such as diethylene glycol or triethylene glycol, and naphtha boiling range aromatic hydrocarbons, it is preferred to use between about 10 and 100 volume percent of aqueous liquid based on extract hydrocarbons.

In this embodiment, the aqueous phase from separator 48 is passed by way of line 51 and line 61 into separator 59. By this means, the glycol solvent present in this aqueous stream is cheaply and conveniently recovered, thereby eliminating a separate distillation operation.

A liquid bottoms product of glycol solvent is withdrawn from the bottom of stripper 54 by way of line 62. Normally, this stream is recycled to extractor 19 by way of valved line 23, etc. When desired, this stream may be withdrawn from the system by way of valved line 63.

A vapor stream is withdrawn overhead from extract stripper 54 and is passed by way of line 64 into heat exchanger 65 wherein the vapors are condensed. The liquid stream is passed by way of line 66 into separator 67. The water introduced into stripper 54 either through the steam distributor 56 or the aqueous liquid distributor 61 passes overhead with the extract hydrocarbons and is separated by gravity in separator 67. The liquid water is withdrawn by way of line 68 and a portion thereof is passed into extract stripper 54 by way of line 61 and distributor 59. Excess water is passed to the sewer by way of valved line 69.

The extract hydrocarbons are withdrawn from separator 67 and are passed by way of line 70 into the vertical midpoint of fractionator 71. This fractionator is provided with a vertical heat exchanger 72 and fractionation equipment not shown. Overhead from fractionator 71 a vapor stream consisting essentially of pentane is withdrawn by way of line 74. This stream is condensed in a heat exchanger not shown and may be recycled to extractor 19 by way of valved line 32, etc. When desired the pentane may be passed out of the system by way of valved line 76. The product aromatic hydrocarbons which are essentially free of non-aromatic hydrocarbons are withdrawn as a bottoms product from fractionator 71 by way of line 77. The necessary amount of reflux aromatic hydrocarbons is passed by way of lines 27 and 29 into extractor 19. The excess which forms the final product is withdrawn from the system by way of valved line 78.

The operation of the glycol solvent recovery procedure of this invention is set out by the following working examples. These examples are illustrative and are not to be considered as limiting the scope of the invention.

*Example 1*

In these examples the extract phase was obtained by contacting a catalytically cracked naphtha with either diethylene glycol or triethylene glycol in a York-Scheibel extraction column at a temperature of about 300° F. under conditions to produce an extract phase consisting of solvent and extract hydrocarbons wherein aromatic hydrocarbons were the predominant component.

The extract phase was separated into an extract hydrocarbon product and solvent by means of a steam distillation operation. The fractionator consisted of an 8 inch I.D. column containing 12 feet of one-half inch Berl saddles. At the bottom of the fractionation section, an internal coil type reboiler was provided to supply the major heat requirements of the operation. Entry points were provided at various points along the fractionation section. At a point just above the top of the packed section, a distributor was provided for the introduction of liquid water into the vapor space just below the point of vapor exit. A condenser was provided which condensed the vapors leaving the vapor exit of the fractionator. The condensed liquid stream was passed to a gravity settler which permitted separation of the water from the extract hydrocarbons. The required amount of water for use in the fractionator was recycled from the separator by means of a pump. The water phases were tested to determine the presence of glycol therein.

*Test 1.*—The extract phase charged in this test consisted of, on a gallons per hour basis, 14.3 parts of triethylene glycol and 4.8 parts of extract. These extract hydrocarbons were derived from a catalytically cracked naphtha having an ASTM end-point of 400° F. The extract phase was charged to the fractionation section at a point 2.5 feet below the top of the packed section and at a temperature of 300° F. Stripping steam was added to the tower at a point just above the reboiler coils at a rate of 90 pounds per hour (equivalent to 10.8 gallons per hour). The solvent in the bottom of the distillative recovery zone was maintained at 340° F. Liquid water at a rate of 2.1 gallons per hour was introduced into the distillation zone at a point above the packed section and below the point of vapor exit. This liquid water was introduced at a temperature of 70° F.; the temperature of the exit vapors beyond the distillation zone was 220° F. The vapors were condensed in a water cooler condenser to a temperature of 70° F. to produce a stream, on a gallons per hour basis, consisting of 12.9 parts of water and and 4.8 parts of extract oil.

Tests on both the water phase and the extract oil phase showed that no glycol was present. From the bottom of the distillation zone triethylene glycol was removed in an amount equal to that introduced into the system, i.e., 14.3 gallons per hour.

*Test 2.*—This test was carried out in a manner essentially the same as that of Test 1 except that the liquid water reflux was not added and additional amounts of stripping steam were introduced into the system equivalent to the amount of liquid water reflux of Test 1. Both the gasoline phase and the water phase from the condensed vapors were tested and found to contain significant amounts of triethylene glycol.

*Test 3.*—This test was carried out in a manner similar to that described for Test 2 except that a reflux steam consisting of extract oil was introduced into the column at the same point that the water stream was introduced in Test 1. The liquid water separated from the condensed vapors was found to contain appreciable amounts of triethylene glycol.

These tests show that despite the fact that the distillation zone was operated at a temperature far below the boiling point of triethylene glycol, appreciable amounts of glycol were carried over with the hydrocarbon vapors and had to be recovered by other methods. Also, it is shown that the presence of a hydrocarbon reflux in the distillation operation does not overcome the loss of glycol in the vapor stream. Test 1 shows that the use of a liquid water stream to contact the vapor mixture removes all of the triethylene glycol from the vapors and this triethylene glycol is recovered as a bottoms product; thus, a separate secondary recovery operation is eliminated by the use of the process of this invention.

Example II

*Test 4.*—In this example, the extract hydrocarbons were derived from a catalytically cracked naphtha having an ASTM end-point of 475° F. In order to vaporize all the extract oil, it was necessary to operate the distillative recovery zone with a bottoms temperature of 400° F. And the extract phase was introduced into the fractionation zone at a point about the vertical mid-point of the packed section. In this test, liquid water was introduced, as described in Test 1, under essentially the same conditions. The extract oil and the separated water from the distillation operation were found to be free of triethylene glycol.

*Test 5.*—This test was carried out under the conditions of Test 4 except that no liquid water was introduced above the point of extract phase entry. The water phase separated from the distillation operation showed the presence of large amounts of triethylene glycol.

These tests show the utility of the process of this invention on very high end-point naphthas, under very severe distillative recovery zone operating conditions.

Example III

*Test 6.*—In this test, the extract hydrocarbons were obtained by extracting a 400° F. end-point catalytic naphtha with diethylene glycol. The distillative recovery zone was operated under conditions similar to those of Test 1. However, the bottoms temperature was lowered to prevent incipient decomposition of diethylene glycol. When operating with the introduction of liquid water at a point above the packed section of the column, the separated extract oil and water were found to be free of diethylene glycol.

*Test 7.*—This test was carried out under conditions similar to those of Test 6 except that no liquid water was introduced into the column above the point of extract phase entry. Large amounts of diethylene glycol were found to be present in the water from the condensed vapors from the distillation zone.

Thus having described the invention, what is claimed is:

1. The process for the recovery of aromatic hydrocarbons, which process comprises (1) contacting a liquid petroleum naphtha containing appreciable amounts of aromatic hydrocarbons, with a liquid glycol solvent under conditions to form an extract phase comprising essentially solvent, and extract hydrocarbons, wherein the aromatic content is markedly greater than the aromatic content of said naphtha, and a raffinite phase (2) separating said extract phase from said raffinate phase (3) distilling extract hydrocarbons from said extract phase under conditions wherein a mixture of extract hydrocarbon and solvent vapors are contacted by a liquid aqueous stream consisting of water and not more than a minor amount of glycol in an amount at least sufficient to remove from said vapor mixture all of the glycol vapors, (4) withdrawing a vapor mixture consisting essentially of extract hydrocarbons and steam from said distillation zone and condensing said vapors to produce a liquid mixture comprising water and extract hydorcarbons, (5) separating the liquid mixture into a water phase and an extract hydrocarbon phase free of glycol and (6) recycling the glycol bottoms product from said distillation zone to the contacting zone of step (1).

2. The process of claim 1 wherein said solvent is a polyethylene glycol.

3. The process of claim 1 wherein said liquid aqueous stream consists of water and a minor amount of polyethylene glycol.

4. The process of claim 1 wherein said liquid aqueous stream is introduced in an amount between about 10 volume percent and 100 volume percent based on extract hydrocarbons present in said extract phase charged to step (3).

5. The process of claim 1 wherein said distillation step is carried out in the presence of steam which is introduced at a point below the point of entry of said extract phase.

6. The process of claim 1 wherein said solvent is diethylene glycol.

7. The process of claim 1 wherein said solvent is triethylene glycol.

8. The process of claim 1 wherein said solvent is tetraethylene glycol.

9. The process of claim 1 wherein said feed comprises essentially a mixture of paraffinic, naphthenic, olefinic and aromatic hydrocarbons.

10. The process of claim 1 wherein said feed is a petroleum naphtha.

11. The process of claim 1 wherein said feed is a naphtha deriverd from the catalytic reforming of naphtha in the presence of hydrogen.

References Cited in the file of this patent

UNITED STATES PATENTS

| | | |
|---|---|---|
| 2,396,301 | Cummings et al. | Mar. 12, 1946 |
| 2,407,820 | Durrum | Sept. 17, 1946 |
| 2,444,582 | Smith | July 6, 1948 |
| 2,635,992 | Carlson et al. | Apr. 21, 1953 |
| 2,638,440 | Drout et al. | May 12, 1953 |
| 2,669,541 | Catterall | Feb. 16, 1954 |
| 2,766,300 | Weedman | Oct. 9, 1956 |
| 2,792,332 | Hutchings | May 14, 1957 |